US012592660B2

(12) United States Patent
Teramoto et al.

(10) Patent No.: US 12,592,660 B2
(45) Date of Patent: Mar. 31, 2026

(54) DRIVING SYSTEM

(71) Applicant: Mitsubishi Electric Corporation,
Tokyo (JP)

(72) Inventors: Kota Teramoto, Tokyo (JP); Kenta Kaneko, Tokyo (JP); Yu Hamada, Tokyo (JP); Toshiki Suzuki, Tokyo (JP); Moriyuki Hazeyama, Tokyo (JP); Tetsuya Kojima, Tokyo (JP); Hisanori Yamasaki, Tokyo (JP)

(73) Assignee: Mitsubishi Electric Corporation,
Tokyo (JP)

( * ) Notice: Subject to any disclaimer, the term of this patent is extended or adjusted under 35 U.S.C. 154(b) by 386 days.

(21) Appl. No.: 18/249,302

(22) PCT Filed: Oct. 30, 2020

(86) PCT No.: PCT/JP2020/040812
§ 371 (c)(1),
(2) Date: Apr. 17, 2023

(87) PCT Pub. No.: WO2022/091339
PCT Pub. Date: May 5, 2022

(65) Prior Publication Data
US 2024/0030853 A1     Jan. 25, 2024

(51) Int. Cl.
*H02P 25/092*     (2016.01)
*B60L 3/00*     (2019.01)
(52) U.S. Cl.
CPC ............ *H02P 25/092* (2016.02); *B60L 3/003* (2013.01); *B60L 2220/18* (2013.01); *B60L 2240/421* (2013.01)

(58) Field of Classification Search
CPC .... H02P 25/08; H02P 5/74; H02P 6/04; B60L 2220/18; B60L 2240/421
See application file for complete search history.

(56) References Cited

U.S. PATENT DOCUMENTS

| | | |
|---|---|---|
| 2017/0110999 A1 | 4/2017 | Shimada et al. |
| 2018/0236999 A1 | 8/2018 | Miyama et al. |
| | (Continued) | |

FOREIGN PATENT DOCUMENTS

| | | |
|---|---|---|
| JP | 2002-199675 A | 7/2002 |
| JP | 2008148377 A | 6/2008 |
| | (Continued) | |

OTHER PUBLICATIONS

Office Action dated Nov. 29, 2023, issued in the corresponding Indian Patent Application No. 202327017659, 6 pages.
(Continued)

*Primary Examiner* — Thai T Dinh
(74) *Attorney, Agent, or Firm* — Buchanan Ingersoll & Rooney PC

(57) ABSTRACT

The drive system includes a motor, a power converter, and a controller. The motor is a reluctance motor that rotates in response to feeding of electric power. The power converter includes multiple switching elements and is connected directly to the motor. The power converter converts electric power fed from a power source into electric power to be fed to the motor and feeds the converted electric power to the motor. The controller controls the switching elements included in the power converter.

16 Claims, 5 Drawing Sheets

(56)                References Cited

U.S. PATENT DOCUMENTS

| | | | |
|---|---|---|---|
| 2019/0222158 A1 | | 7/2019 | Taniguchi et al. |
| 2021/0270911 A1* | | 9/2021 | Kageyama ............. H02M 1/32 |

FOREIGN PATENT DOCUMENTS

| | | | | | |
|---|---|---|---|---|---|
| JP | 2009227221 A | * | 10/2009 | | |
| JP | 2010136537 A | * | 6/2010 | | |
| JP | 2012075317 A | * | 4/2012 | | |
| JP | 2016025742 A | * | 2/2016 | | |
| JP | 2017-057077 A | | 3/2017 | | |
| JP | 2018-042321 A | | 3/2018 | | |
| JP | 2018042423 A | * | 3/2018 | | |
| JP | 2018-057077 A | | 4/2018 | | |
| JP | 2018166349 A | * | 10/2018 | .............. | H02P 27/06 |
| JP | 2020-044949 A | | 3/2020 | | |
| JP | 2020-108232 A | | 7/2020 | | |
| WO | 2015/159694 A1 | | 10/2015 | | |
| WO | 2017/073144 A1 | | 5/2017 | | |
| WO | 2020/067304 A1 | | 4/2020 | | |
| WO | WO-2020110315 A1 | * | 6/2020 | .............. | H02P 21/32 |

OTHER PUBLICATIONS

Notice of Reasons for Refusal dated Oct. 1, 2024, issued in the corresponding Japanese Patent Application No. 2022-558748 (appeal No. 2024-3868), 39 pages including 18 pages of English Translation.

Notice of Reasons for Refusal dated Jan. 7, 2025, issued in the corresponding Japanese Patent Application No. 2022-558748, 45 pages including 21 pages of English Translation.

Watanabe, et al., "The Practical Application of SiC as A Next-generation Semiconductor—The 1000 Series Equipped with SiC Inverter on The Tokyo Metro Ginza Line", The Journal of The Institute of Electrical Engineers of Japan, vol. 135, No. 10, 2015, pp. 676-679 (6 pages).

Notice of Termination of Reconsideration by Examiners before Appeal Proceedings dated Apr. 16, 2024, issued in the corresponding Japanese Patent Application No. 2022-558748, 7 pages including 3 pages of English Translation.

Notice of Reasons for Refusal dated Aug. 8, 2023, issued in the corresponding Japanese Patent Application No. 2022-558748, 6 pages including 3 pages of English Translation.

International Search Report (PCT/ISA/210) with translation and Written Opinion (PCT/ISA/237) mailed on Dec. 28, 2020, by the Japan Patent Office as the International Searching Authority for International Application No. PCT/JP2020/040812.

Japanese Office Action mailed Jan. 31, 2023, by the Japan Patent Office for JP Application No. 2022-558748 and an English translation.

Notice of Reasons for Refusal dated Dec. 16, 2025, issued in the corresponding Japanese Patent Application No. 2024-033041, 9 pages including 4 pages of English Translation.

* cited by examiner

DRIVING SYSTEM

TECHNICAL FIELD

The present disclosure relates to a drive system.

BACKGROUND ART

Some drive systems installed in electric railway vehicles convert DC power fed from a substation via an overhead wire into desired AC power and feed the AC power to motors to drive the motors to generate propulsive force of the electric railway vehicles. Because of the limited space under the floor of the railway vehicle, such a drive system preferably includes a small number of motors to generate propulsive force for allowing the railway vehicle to run at a target speed.

Some of the drive systems employ synchronous motors having a higher efficiency than induction motors as the motors. A typical example of this type of drive system is disclosed in Patent Literature 1. The electric vehicle control device disclosed in Patent Literature 1 includes permanent-magnet synchronous motors, inverters associated with the respective permanent-magnet synchronous motors on a one-to-one basis, and gate controllers for controlling the inverters.

CITATION LIST

Patent Literature

Patent Literature 1: Unexamined Japanese Patent Application Publication No. 2012-075317

SUMMARY OF INVENTION

Technical Problem

In an exemplary case where an inverter stops due to a short-circuit fault in the inverter under no loads, the permanent-magnet synchronous motor unintentionally generates a no-load induced voltage proportional to the rotational speed of the motor because of the permanent magnet. In the electric vehicle control device disclosed in Patent Literature 1, this phenomenon causes a current to flow from the permanent-magnet synchronous motor to the inverter when the inverter stops. This current resulting from the no-load induced voltage and flowing from the permanent-magnet synchronous motor to the inverter can cause a failure. In order to avoid such a failure, the electric vehicle control device disclosed in Patent Literature 1 is also provided with contactors between the inverters and the permanent-magnet synchronous motors.

The electric vehicle control device disclosed in Patent Literature 1 requires contactors of which the number is equal to the number of permanent-magnet synchronous motors, and thus inevitably has a more complicated structure and a larger size. This problem can occur not only in drive systems fed with electric power from overhead wires but also in drive systems for driving permanent-magnet synchronous motors by means of electric power fed from power sources.

An objective of the present disclosure, which has been accomplished in view of the above situations, is to provide a drive system having a simple structure.

Solution to Problem

In order to achieve the above objective, a drive system according to an aspect of the present disclosure includes a reluctance motor, a converter, and a controller. The reluctance motor rotates in response to feeding of electric power. The power converter includes multiple switching elements and is connected directly to the reluctance motor. The power converter converts electric power fed from a power source into electric power to be fed to the reluctance motor and feeds the converted electric power to the reluctance motor. The controller controls the switching elements included in the power converter.

Advantageous Effects of Invention

In the drive system according to an aspect of the present disclosure, the power converter is connected directly to the reluctance motor. The drive system does not require a contactor between the power converter and the reluctance motor and therefore has a simplified structure.

DESCRIPTION OF EMBODIMENTS

Figure 1:
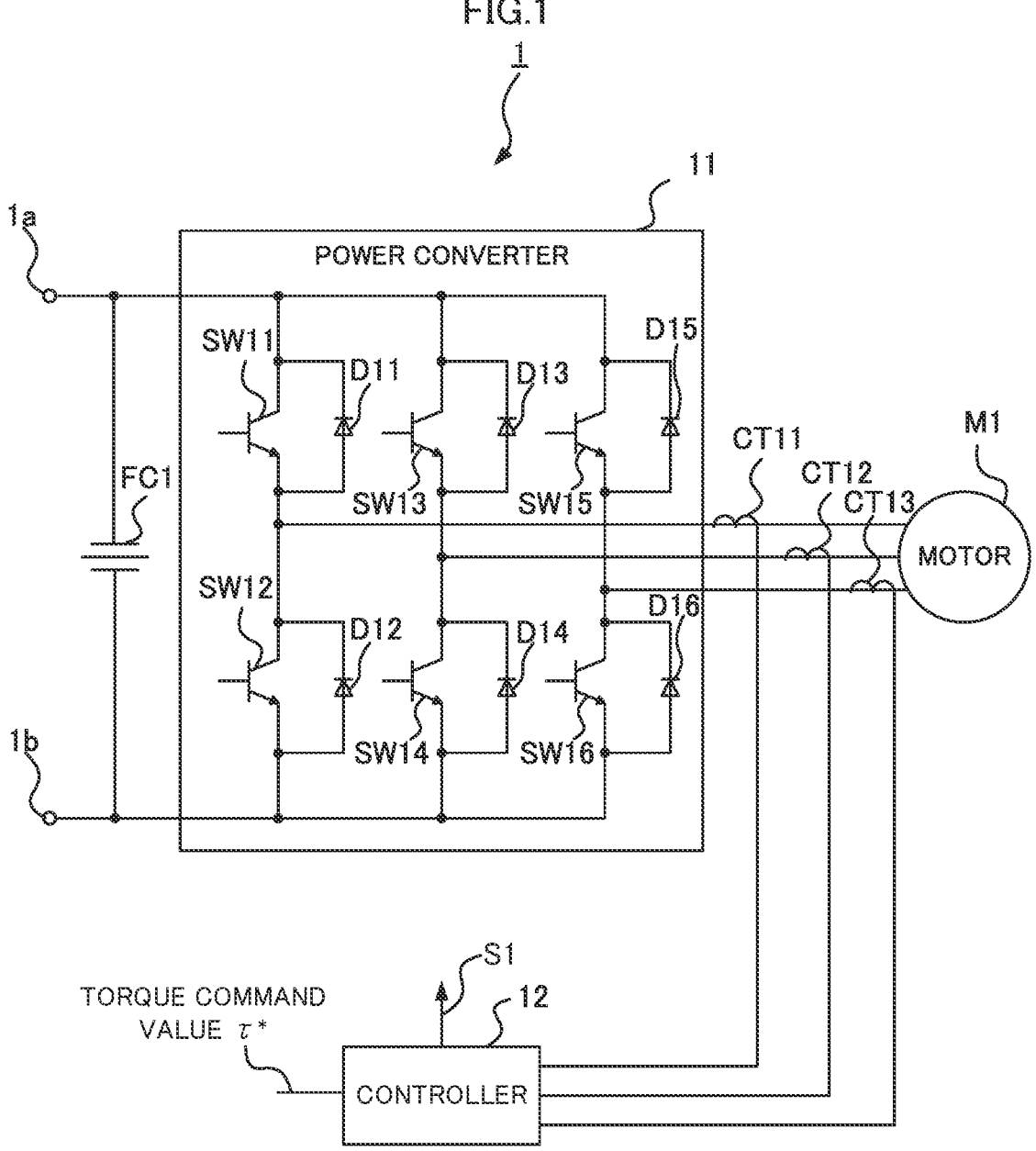
FIG. 1 is a block diagram illustrating a drive system according to an embodiment.

A drive system according to an embodiment of the present disclosure is described in detail below with reference to the accompanying drawings. In the drawings, the components identical or corresponding to each other are provided with the same reference symbol.

The following description is directed to a drive system 1 according to an embodiment, focusing on an exemplary drive system for generating propulsive force of a railway vehicle. The drive system 1 illustrated in FIG. 1 is installed under the floor of the railway vehicle, for example. The drive system 1, for example, converts DC power into three-phase AC power, feeds the three-phase AC power to a motor, and thus drives the motor, thereby generating propulsive force of the railway vehicle.

The drive system 1 includes a terminal 1a connected to a power source, a terminal 1b that is grounded, a filter capacitor FC1 to be charged with DC power fed from the power source, and a power converter 11, which is a DC/AC three-phase converter to convert the DC power fed from the power source via the filter capacitor FC1 into three-phase AC power. The drive system 1 further includes a motor M1, which is a reluctance motor to rotate in response to feeding of the three-phase AC power from the power converter 11, current sensors CT11, CT12, and CT13 to measure values of phase currents flowing to the motor M1, and a controller 12 to control switching elements SW11, SW12, SW13, SW14, SW15, and SW16 included in the power converter 11.

The power converter 11 is connected directly to the motor M1. This direct connection means the connection of components without an active element therebetween. Specifically, the power converter 11 is connected to the motor M1 without a switching circuit therebetween, which serves to electrically disconnect the motor M1 from the power converter 11. Examples of the switching circuit include electromagnetic contactors, semiconductor switches, and mechanical switches to be manually operated. Since the power converter 11 is connected directly to the motor M1, the drive system 1 has a simpler structure than that of a drive system provided with a contactor between a power converter and a permanent-magnet synchronous motor.

The individual components of the drive system 1 are described in detail below.

The terminal 1a is electrically connected to the power source, which is not illustrated. A typical example of the power source is a current collector to acquire electric power from a power supply line. The power supply line is an overhead wire or a third rail, for example. The current collector is a pantograph or a contact shoe, for example. The terminal 1a is preferably electrically connected to the current collector via a device, such as contactor or filter reactor. The terminal 1b is grounded via a wheel.

The filter capacitor FC1 has one end electrically connected to the terminal 1a, and the other end electrically connected to the terminal 1b. The filter capacitor FC1 constitutes a filter together with the filter reactor, which is provided between the terminal 1a and the current collector as described above, and thereby reduces harmonic components.

The power converter 11 is an inverter to convert DC power into three-phase AC power, for example, an inverter capable of variable voltage variable frequency control. The power converter 11 according to the embodiment includes the switching elements SW11 and SW12 connected to a U-phase coil of the motor M1, the switching elements SW13 and SW14 connected to a V-phase coil of the motor M1, and the switching elements SW15 and SW16 connected to a W-phase coil of the motor M1. The power converter 11 also includes freewheeling diodes D11, D12, D13, D14, D15, and D16 connected in parallel to the respective switching elements SW11, SW12, SW13, SW14, SW15, and SW16.

The switching elements SW11 and SW12 are connected in series to each other, the switching elements SW13 and SW14 are connected in series to each other, and the switching elements SW15 and SW16 are connected in series to each other. The point of connection between the switching elements SW11 and SW12 is connected directly to the U-phase coil of the motor M1. The point of connection between the switching elements SW13 and SW14 is connected directly to the V-phase coil of the motor M1. The point of connection between the switching elements SW15 and SW16 is connected directly to the W-phase coil of the motor M1. The serially connected switching elements SW11 and SW12, the serially connected switching elements SW13 and SW14, and the serially connected switching elements SW15 and SW16 are connected in parallel to one another.

The switching elements SW11, SW12, SW13, SW14, SW15, and SW16 are switched between on and off states by the controller 12. The power converter 11 thus converts the DC power fed from the power source via the filter capacitor FC1 into three-phase AC power to be fed to the motor M1. The power converter 11 then feeds the three-phase AC power to the motor M1. For example, the switching elements SW11, SW12, SW13, SW14, SW15, and SW16 are insulated gate bipolar transistors (IGBTs).

The motor M1 to be fed with the three-phase AC power from the power converter 11 is a reluctance motor, and thus has a low power factor and requires a reactive current. A conceivable solution is expansion of the volume of the power converter 11, but the power converter 11 having an expanded volume inevitably has an increased size.

In order to reduce the iron loss in the motor M1, the power converter 11 needs to execute high-frequency switching. In the case where the switching elements SW11, SW12, SW13, SW14, SW15, and SW16 are semiconductor devices made of silicon, the high-frequency switching generates increased amounts of heat, and requires a larger cooling device for cooling the switching elements SW11, SW12, SW13, SW14, SW15, and SW16.

Existing railway vehicles do not include reluctance motors because a vehicle control apparatus including a large power converter and a large cooling device cannot be readily installed in the limited space under the floor or on the roof of a railway vehicle. In this embodiment, wide-gap semiconductors are employed as the switching elements SW11, SW12, SW13, SW14, SW15, and SW16 included in the power converter 11. This configuration can achieve expansion of the volume of the power converter 11 and execution of high-frequency switching while maintaining the sufficiently small size of the power converter 11, and allow a reluctance motor to be employed as the motor M1. The wide-gap semiconductors are made of a material, such as silicon carbide, gallium nitride material, or diamond, having a larger bandgap than silicon.

The anodes of the freewheeling diodes D11, D12, D13, D14, D15, and D16 are respectively connected to the emitters of the switching elements SW11, SW12, SW13, SW14, SW15, and SW16, and the cathodes are respectively connected to the collectors of the switching elements SW11, SW12, SW13, SW14, SW15, and SW16. This circuitry suppress an inverse current from flowing to the switching elements SW11, SW12, SW13, SW14, SW15, and SW16.

The motor M1 is a reluctance motor to rotate in response to feeding of three-phase AC power from the power converter 11. The motor M1 according to the embodiment is a synchronous reluctance motor including no permanent magnet. The motor M1 lacks a permanent magnet and thus is free from a no-load induced voltage. This configuration therefore does not require a contactor between the power converter 11 and the motor M1 for electrically disconnecting the motor M1 from the power converter 11 in order to suppress a current from flowing from the motor M1 to the power converter 11 when the power converter 11 stops. In other words, the configuration allows the power converter 11 to be connected directly to the motor M1.

The current sensors CT11, CT12, and CT13 measure values of phase currents flowing to the motor M1 and output the measured current values to the controller 12. For example, the current sensors CT11, CT12, and CT13 are current transformer (CT) sensors.

In detail, the current sensor CT11 is provided to a bus bar that connects the point of connection between the switching elements SW11 and SW12 to the U-phase coil of the motor M1, and measures a value of U-phase current flowing from the power converter 11 to the motor M1. The current sensor CT12 is provided to a bus bar that connects the point of connection between the switching elements SW13 and SW14 to the V-phase coil of the motor M1, and measures a value of V-phase current flowing from the power converter 11 to the motor M1. The current sensor CT13 is provided to a bus bar that connects the point of connection between the switching elements SW15 and SW16 to the W-phase coil of the motor M1, and measures a value of W-phase current flowing from the power converter 11 to the motor M1.

The controller 12 generates gate signals S1 for controlling the switching elements SW11, SW12, SW13, SW14, SW15, and SW16, on the basis of a torque command value τ* in accordance with an operation at a master controller installed in a cab, which is not illustrated, of the railway vehicle, and the measured current values acquired from the current sensors CT11, CT12, and CT13. The controller 12 then outputs the generated gate signals S1.

Figure 2:
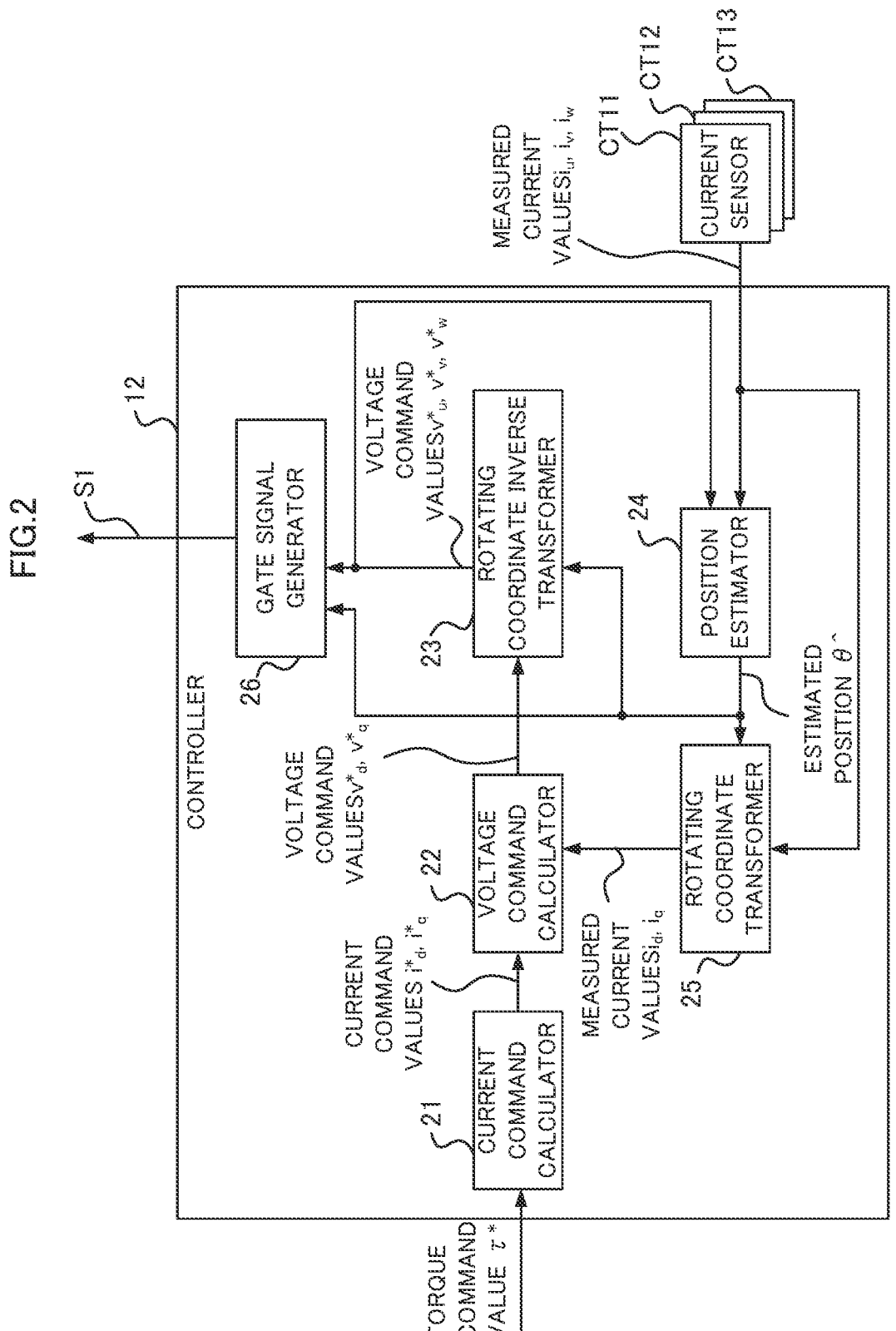
FIG. 2 is a block diagram illustrating a controller according to the embodiment.

As illustrated in FIG. 2, the controller 12 includes a current command calculator 21 to calculate current command values from the torque command value $\tau^*$, a voltage command calculator 22 to calculate voltage command values from the current command values, and a rotating coordinate inverse transformer 23 to execute coordinate transformation of the voltage command values. The controller 12 further includes a position estimator 24 to estimate a position of the magnetic pole of the rotor included in the motor M1, a rotating coordinate transformer 25 to execute coordinate transformation of the measured current values, and a gate signal generator 26 to generate gate signals S1.

The current command calculator 21 calculates current command values $i^*_d$ and $i^*_q$ in the rotating coordinate for achieving the target torque of the motor M1 indicated by the torque command value $\tau^*$. For example, the current command values $i^*_d$ and $i^*_q$ provide the minimum current effective value relative to the torque, that is, the minimum copper loss of the motor M1.

The voltage command calculator 22 calculates voltage command values $v^*_d$ and $v^*_q$ in the rotating coordinate, by obtaining the proportional integral of the differences $(i^*_d - i_d)$ and $(i^*_q - i_q)$ between the current command values $i^*_d$ and $i^*_q$ calculated by the current command calculator 21 and the measured current values $i_d$ and $i_q$ generated by the rotating coordinate transformer 25.

The rotating coordinate inverse transformer 23 converts the voltage command values $v^*_d$ and $v^*_q$ in the rotating coordinate into voltage command values $v^*_\alpha$ and $v^*_\beta$ in the two-phase coordinate, on the basis of a transformation matrix containing an estimated position $\theta^\wedge$, that is, a position of the magnetic pole of the rotor included in the motor M1 estimated by the position estimator 24. The rotating coordinate inverse transformer 23 then converts the voltage command values $v^*_\alpha$ and $v^*_\beta$ in the two-phase coordinate into voltage command values $v^*_u$, $v^*_v$, and $v^*_w$ in the three-phase coordinate, on the basis of a two-phase/three-phase transformation matrix.

The position estimator 24 estimates a position of the magnetic pole of the rotor included in the motor M1, on the basis of the measured current values $i_u$, $i_v$, and $i_w$ acquired from the current sensors CT11, CT12, and CT13, and the voltage command values $v^*_u$, $v^*_v$, and $v^*_w$ in the three-phase coordinate calculated by the rotating coordinate inverse transformer 23. The estimated position $\theta^\wedge$, that is, the position of the magnetic pole of the rotor estimated by the position estimator 24 is represented in terms of electrical angle.

The rotating coordinate transformer 25 converts the measured current values $i_u$, $i_v$, and $i_w$ in the three-phase coordinate into measured current values $i_\alpha$ and $i_\beta$ in the two-phase coordinate, on the basis of a three-phase/two-phase transformation matrix. The rotating coordinate transformer 25 then converts the measured current values $i_\alpha$ and $i_\beta$ in the two-phase coordinate into measured current values $i_d$ and $i_q$ in the rotating coordinate, on the basis of a transformation matrix containing the estimated position $\theta^\wedge$.

Figure 3:
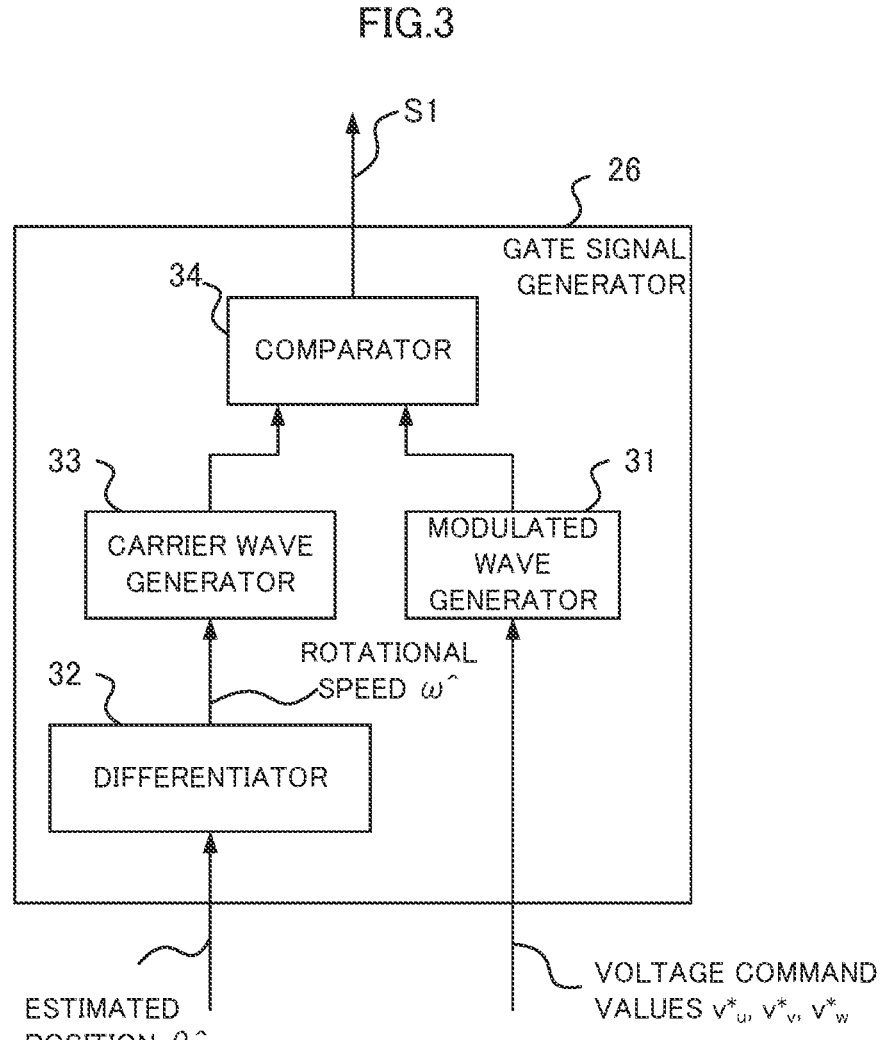
FIG. 3 is a block diagram illustrating a gate signal generator according to the embodiment.

The gate signal generator 26 generates gate signals S1 through pulse width modulation (PWM) control. In detail, as illustrated in FIG. 3, the gate signal generator 26 includes a modulated wave generator 31 to generate modulated waves in accordance with the voltage command values $v^*_u$, $v^*_v$, and $v^*_w$, a differentiator 32 to calculate a rotational speed $\omega^\wedge$ of the motor M1 through differentiation of the estimated position $\theta^\wedge$, a carrier wave generator 33 to generate a carrier wave in accordance with the rotational speed $\omega^\wedge$ of the motor M1, and a comparator 34 to generate gate signals on the basis of comparison between the modulated waves and the carrier wave.

The modulated wave generator 31 generates modulated waves on the basis of the voltage command values $v^*_u$, $v^*_v$, and $v^*_w$ in the three-phase coordinate acquired from the rotating coordinate inverse transformer 23. The modulated waves are signals obtained through standardization of the voltage command values $v^*_u$, $v^*_v$, and $v^*_w$ using the value of the voltage between the terminals of the filter capacitor FC1.

The differentiator 32 calculates a rotational speed $\omega^\wedge$ of the motor M1 through differentiation of the estimated position OA.

The carrier wave generator 33 generates a carrier wave in accordance with the rotational speed $\omega^\wedge$ of the motor M1 calculated by the differentiator 32. The frequency of the carrier wave increases in accordance with acceleration of the rotational speed of the motor M1. In other words, the frequency of the carrier wave has a positive correlation with the rotational speed of the motor M1. The carrier wave generator 33 according to the embodiment generates a carrier wave, which is a signal obtained by multiplying the frequency of the modulated waves. The operation mode of the gate signal generator 26, in the case where the carrier wave is synchronized with the modulated waves and is a signal obtained by multiplying the frequency of the modulated waves, is defined as a synchronous multiple pulse mode. For example, when the gate signal generator 26 operates in the synchronous multiple pulse mode, the carrier wave generator 33 generates a carrier wave of which the frequency is 15 times higher than the frequency of the modulated waves.

The comparator 34 generates gate signals S1 on the basis of comparison between the modulated waves generated by the modulated wave generator 31 and the carrier wave generated by the carrier wave generator 33, and outputs the generated gate signals S1 to the switching elements SW11, SW12, SW13, SW14, SW15, and SW16. In detail, the gate signals S1 for the switching elements SW11, SW13, and SW15 are at a high (H) level when the value of the modulated waves is equal to or higher than the value of the carrier wave, and at a low (L) level when the value of the modulated waves is lower than the value of the carrier wave. The gate signals S1 for the switching elements SW12, SW14, and SW16 are at an L level when the value of the modulated waves is equal to or higher than the value of the carrier wave, and at an H level when the value of the modulated waves is lower than the value of the carrier wave.

The switching elements SW11, SW12, SW13, SW14, SW15, and SW16 are switched between on and off states in accordance with the gate signals S1 output from the comparator 34. The gate signal generator 26 operating in the synchronous multiple pulse mode can reduce the distortion of currents flowing to the motor M1 and allow the motor M1 to function with high efficiency.

As described above, the motor M1 included in the drive system 1 according to the embodiment is a synchronous reluctance motor including no permanent magnet and thus is free from a no-load induced voltage. The drive system 1 therefore does not require a contactor for electrically disconnecting the motor M1 from the power converter 11 in the case of stop of the inverter due to a short-circuit fault in the inverter, for example, and allows the power converter 11 to be connected directly to the motor M1. The drive system 1 according to the embodiment does not need a contactor and thus has a simpler structure than that of a drive system provided with a contactor between a power converter and a motor.

The above-described examples are not to be construed as limiting the present disclosure. The drive system 1 may include multiple power converters 11 and multiple motors M1. Because the power converters 11 and the motors M1 need to be associated with each other on a one-to-one basis, the number of power converters 11 is equal to the number of motors M1 in the drive system 1.

Figure 4:
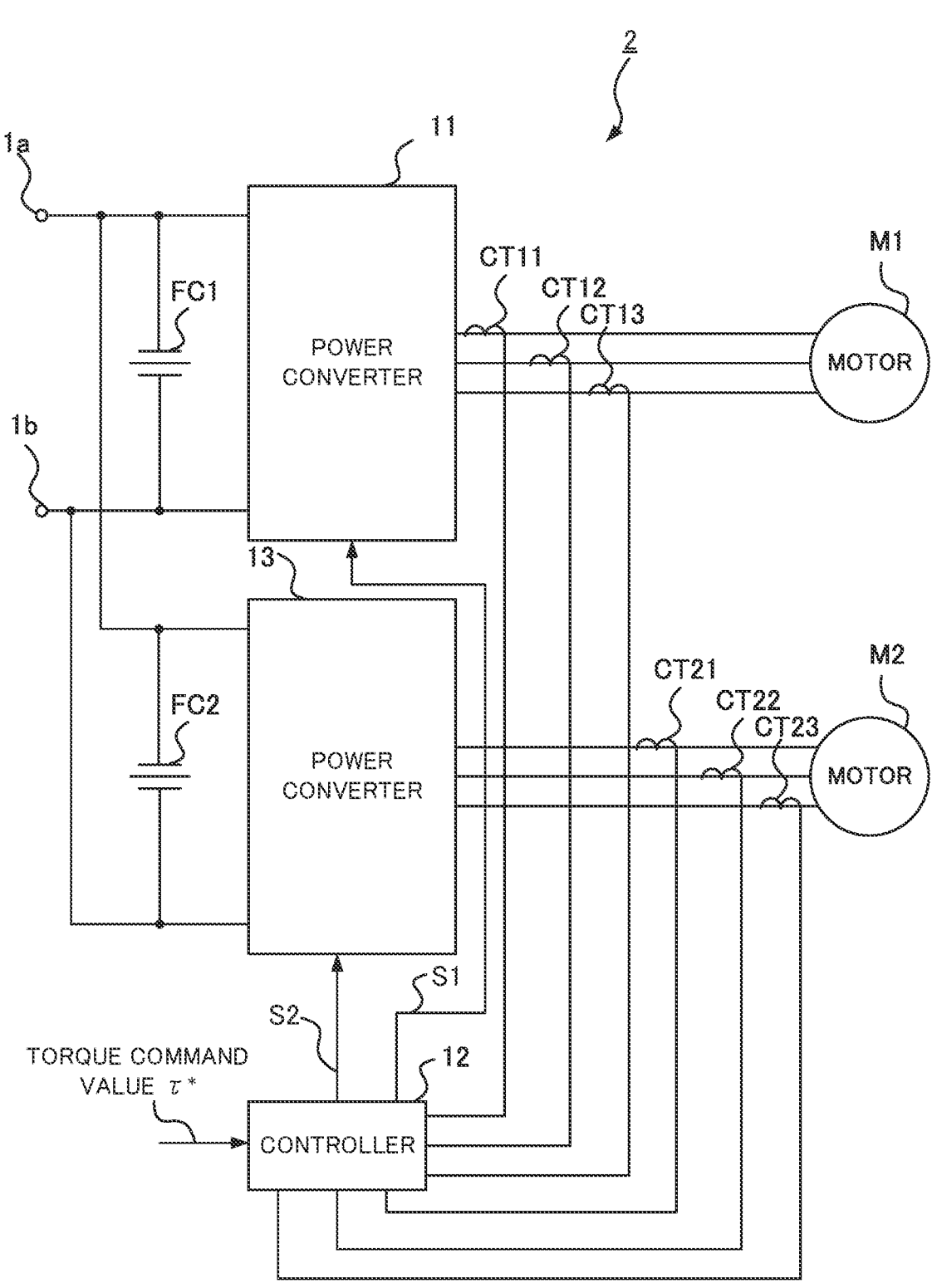
FIG. 4 is a block diagram illustrating a drive system according to a first modification of the embodiment.

For example, FIG. 4 illustrates a drive system 2 including two power converters 11 and 13, two motors M1 and M2, and two filter capacitors FC1 and FC2 to be charged with electric power fed from a power source, which is not illustrated. The power converters 11 and 13 have the identical configuration. The motors M1 and M2 have the identical configuration. The filter capacitors FC1 and FC2 have the identical configuration. The drive system 2 also includes current sensors CT11, CT12, and CT13 to measure values of phase currents flowing to the motor M1, current sensors CT21, CT22, and CT23 to measure values of phase currents flowing to the motor M2, and a controller 12 to control multiple switching elements included in each of the power converters 11 and 13.

The filter capacitors FC1 and FC2 are connected to the power source so as to be in parallel to each other. In detail, the filter capacitor FC1 has one end connected to the terminal 1a, and the other end connected to the terminal 1b. The filter capacitor FC2 has one end connected to the terminal 1a, and the other end connected to the terminal 1b. The filter capacitors FC1 and FC2 are charged with electric power fed from the power source.

As in the above-described embodiment, the current sensors CT11, CT12, and CT13 measure values of phase currents flowing to the motor M1 and output the measured current values to the controller 12. The current sensors CT21, CT22, and CT23 measure values of phase currents flowing to the motor M2 and output the measured current values to the controller 12. The current sensors CT21, CT22, and CT23 are provided to the respective bus bars that connect the power converter 13 to the motor M2, like the current sensors CT11, CT12, and CT13.

The controller 12 generates gate signals S1 for controlling the switching elements included in the power converter 11, on the basis of a torque command value τ* indicating a target torque of the motor M1 and the current values measured by the current sensors CT11, CT12, and CT13, and then outputs the generated gate signals S1, as in the above-described embodiment. The controller 12 also generates gate signals S2 for controlling the switching elements included in the power converter 13, on the basis of a torque command value τ* indicating a target torque of the motor M2 and the current values measured by the current sensors CT21, CT22, and CT23, and then outputs the generated gate signals S2. The gate signals S1 and S2 are generated in the same manner as in the embodiment.

In the drive system 2 including the motors M1 and M2, the power converter 11 is connected directly to the motor M1, and the power converter 13 is connected directly to the motor M2. The drive system 2 therefore has a simpler structure than that of a drive system provided with contactors between power converters and motors.

Figure 5:
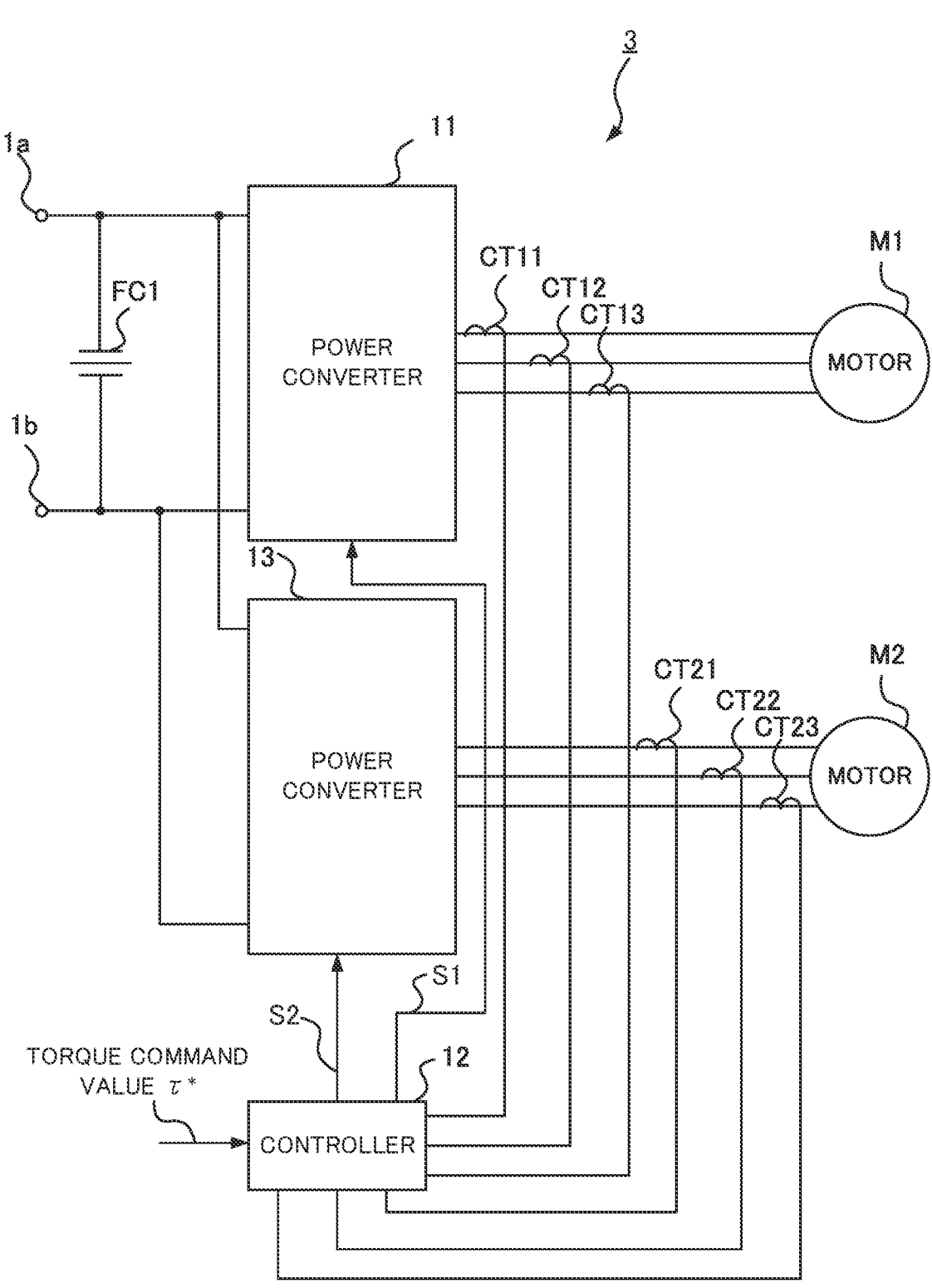
FIG. 5 is a block diagram illustrating a drive system according to a second modification of the embodiment.

Although the drive system 2 includes the filter capacitors FC1 and FC2 of which the number is equal to the number of power converters 11 and 13 in the example illustrated in FIG. 4, the power converters 11 and 13 may also be connected to a single filter capacitor in common. FIG. 5 illustrates a drive system 3 that includes a filter capacitor FC1 alone. The drive system 3 differs from the drive system 2 in that the power converters 11 and 13 are connected to the filter capacitor FC1 in common.

The drive systems 1 to 3 do not necessarily include all of the current sensors CT11, CT12, and CT13 and may include only two of the current sensors CT11, CT12, and CT13. For example, the drive systems 1 to 3 may cause the current sensors CT11 and CT12 to measure values of U-phase and V-phase currents flowing to the motor M1 and calculate a value of W-phase current from the measured values of U-phase and V-phase currents. In this case, the controller 12 generates gate signals S1 on the basis of the measured values of U-phase and V-phase currents and the calculated value of W-phase current.

The drive systems 2 and 3 may include any number of power converters 11 and 13 and any number of motors M1 and M2, provided that the number of power converters is equal to the number of motors.

The drive systems 2 and 3 may include two controllers 12 independent from each other. In this case, one of the controllers 12 controls the power converter 11, and the other controller 12 controls the power converter 13.

Although the direct connection means the connection of components without an active element therebetween in the above-described embodiment, the power converter 11 and the motor M1 may also be connected to each other with none of an active element and a passive element therebetween. The same holds true for the connection between the power converter 13 and the motor M2.

The scope of the direct connection between the power converter 11 and the motor M1 encompasses the connections via a component, such as relay terminal or relay cable. In an exemplary case where the power converter 11 and the motor M1 are installed in mutually different vehicle bodies, the power converter 11 and the motor M1 are connected to each other via a relay terminal. The same holds true for the direct connection between the power converter 13 and the motor M2.

The carrier wave and the modulated waves are not necessarily synchronized with each other. The mode, in the case where the carrier wave is not synchronized with the modulated waves and have a frequency higher than the frequency of the modulated waves, is defined as an asynchronous multiple pulse mode. The gate signal generator 26 operating in the asynchronous multiple pulse mode can reduce the distortion of currents flowing to the motor M1 and allow the motor M1 to function with high efficiency, as in the case of the synchronous multiple pulse mode.

The frequency of the carrier wave may be equal to the frequency of the modulated waves in the case of a low rotational speed of the motor M1.

The controller 12 may acquire a measured value from a position sensor for measuring a position of the magnetic pole of the rotor included in the motor M1, and generate gate signals S1 in accordance with the value measured by the position sensor. In this case, the gate signal generator 26 lacks the position estimator 24 and generates gate signals S1 in accordance with the value measured by the position sensor.

The motor M1 may also be a switched reluctance motor, for example, provided that the motor M1 includes no permanent magnet.

The switching elements SW11, SW12, SW13, SW14, SW15, and SW16 may be semiconductor devices made of silicon, and the freewheeling diodes D11, D12, D13, D14, D15, and D16 may be wide-gap semiconductors.

The drive systems 1 to 3 are not necessarily installed under the floors of railway vehicles and may also be installed at any site. For example, the drive systems 1 to 3 may be installed on the roofs of railway vehicles.

The drive systems 1 to 3 may be installed not only in railway vehicles of a DC feeding system but also in railway vehicles of an AC feeding system. Any of the drive systems 1 to 3 installed in a railway vehicle of an AC feeding system is fed with electric power, which is subject to voltage reduction at a transformer and conversion at a converter from AC power into DC power.

The drive systems 1 to 3 may be installed in railway vehicles other than electric railway vehicles. For example, any of the drive systems 1 to 3 may be installed in a diesel vehicle and fed with electric power from a generator driven by an internal combustion engine to generate electric power. For another example, any of the drive systems 1 to 3 may be installed in a rechargeable battery vehicle and fed with electric power from a rechargeable battery.

The drive systems 1 to 3 may be installed in any moving body, such as automobile, marine vessel, or aircraft, other than the railway vehicles.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Drive system
1a, 1b Terminal
11, 13 Power converter
12 Controller
21 Current command calculator
22 Voltage command calculator
23 Rotating coordinate inverse transformer
24 Position estimator
Rotating coordinate transformer
26 Gate signal generator
31 Modulated wave generator
32 Differentiator
33 Carrier wave generator
34 Comparator
CT11, CT12, CT13, CT21, CT22, CT23 Current sensor
D11, D12, D13, D14, D15, D16 Freewheeling diode
FC1, FC2 Filter capacitor
M1, M2 Motor
S1, S2 Gate signal
SW11, SW12, SW13, SW14, SW15, SW16 Switching element

The invention claimed is:

1. A drive system for generating propulsive force of a railway vehicle, the drive system comprising:
   a synchronous reluctance motor to rotate in response to feeding of electric power and thereby generate the propulsive force of the railway vehicle;
   power converting circuitry comprising switching elements and freewheeling diodes each connected in parallel to a corresponding one of the switching elements, the power converting circuitry being connected directly to the synchronous reluctance motor and configured to convert electric power fed from an overhead wire or third rail into electric power to be fed to the synchronous reluctance motor and feed the converted electric power to the synchronous reluctance motor; and
   controlling circuitry to control the switching elements included in the power converting circuitry, wherein
   at least either of the switching elements or the freewheeling diodes comprise wide-gap semiconductors,
   the power converting circuitry is connected to the synchronous reluctance motor, without a switching circuit therebetween, by direct connection that is a connection via a conductor only or a connection via a conductor and a passive element, and
   wherein the controlling circuitry generates gate signals for the switching elements, on a basis of comparison between modulated waves and a carrier wave, the modulated waves being associated with voltage command values for achieving a target torque of the synchronous reluctance motor, the carrier wave having a frequency increasing in accordance with acceleration of a rotational speed of the synchronous reluctance motor.

2. The drive system according to claim 1, wherein the switching elements comprise wide-gap semiconductors.

3. The drive system according to claim 2, wherein the controlling circuitry generates gate signals for the switching elements in accordance with a position of a magnetic pole of a rotor included in the synchronous reluctance motor.

4. The drive system according to claim 3, wherein
   the power converting circuitry comprises a plurality of pieces of power converting circuitry,
   the synchronous reluctance motor comprises a plurality of synchronous reluctance motors, a number of which is equal to a number of the plurality of pieces of power converting circuitry, and
   the plurality of pieces of power converting circuitry is connected directly to the plurality of respective synchronous reluctance motors on a one-to-one basis.

5. The drive system according to claim 4, further comprising:
   a filter capacitor to be charged with electric power fed from the overhead wire or the third
   rail, wherein the plurality of pieces of power converting circuitry is connected to the filter capacitor in common.

6. The drive system according to claim 4, further comprising:
   a plurality of filter capacitors, a number of which is equal to the number of the plurality of pieces of power converting circuitry, the plurality of filter capacitors being configured to be charged with electric power fed from the overhead wire or the third rail, wherein
   the plurality of filter capacitors is connected to the plurality of respective pieces of power converting circuitry on a one-to-one basis.

7. The drive system according to claim 2, wherein
   the power converting circuitry comprises a plurality of pieces of power converting circuitry,
   the synchronous reluctance motor comprises a plurality of synchronous reluctance motors, a number of which is equal to a number of the plurality of pieces of power converting circuitry, and
   the plurality of pieces of power converting circuitry is connected directly to the plurality of respective synchronous reluctance motors on a one-to-one basis.

8. The drive system according to claim 7, further comprising:

a filter capacitor to be charged with electric power fed from the overhead wire or the third rail, wherein the plurality of pieces of power converting circuitry is connected to the filter capacitor in common.

9. The drive system according to claim 7, further comprising:

a plurality of filter capacitors, a number of which is equal to the number of the plurality of pieces of power converting circuitry, the plurality of filter capacitors being configured to be charged with electric power fed from the overhead wire or the third rail, wherein the plurality of filter capacitors is connected to the plurality of respective pieces of power converting circuitry on a one-to-one basis.

10. The drive system according to claim 1, wherein the controlling circuitry generates gate signals for the switching elements in accordance with a position of a magnetic pole of a rotor included in the synchronous reluctance motor.

11. The drive system according to claim 10, wherein the power converting circuitry comprises a plurality of pieces of power converting circuitry, the synchronous reluctance motor comprises a plurality of synchronous reluctance motors, a number of which is equal to a number of the plurality of pieces of power converting circuitry, and the plurality of pieces of power converting circuitry is connected directly to the plurality of respective synchronous reluctance motors on a one-to-one basis.

12. The drive system according to claim 11, further comprising:

a filter capacitor to be charged with electric power fed from the overhead wire or the third rail, wherein the plurality of pieces of power converting circuitry is connected to the filter capacitor in common.

13. The drive system according to claim 11, further comprising:

a plurality of filter capacitors, a number of which is equal to the number of the plurality of pieces of power converting circuitry, the plurality of filter capacitors being configured to be charged with electric power fed from the overhead wire or the third rail, wherein the plurality of filter capacitors is connected to the plurality of respective pieces of power converting circuitry on a one-to-one basis.

14. The drive system according to claim 1, wherein the power converting circuitry comprises a plurality of pieces of power converting circuitry, the synchronous reluctance motor comprises a plurality of synchronous reluctance motors, a number of which is equal to a number of the plurality of pieces of power converting circuitry, and the plurality of pieces of power converting circuitry is connected directly to the plurality of respective synchronous reluctance motors on a one-to-one basis.

15. The drive system according to claim 14, further comprising:

a filter capacitor to be charged with electric power fed from the overhead wire or the third rail, wherein the plurality of pieces of power converting circuitry is connected to the filter capacitor in common.

16. The drive system according to claim 14, further comprising:

a plurality of filter capacitors, a number of which is equal to the number of the plurality of pieces of power converting circuitry, the plurality of filter capacitors being configured to be charged with electric power fed from the overhead wire or the third rail, wherein the plurality of filter capacitors is connected to the plurality of respective pieces of power converting circuitry on a one-to-one basis.

* * * * *